GÜNTER WAHLE
HEINZ-CHRISTEN LORENZEN
INVENTORS.

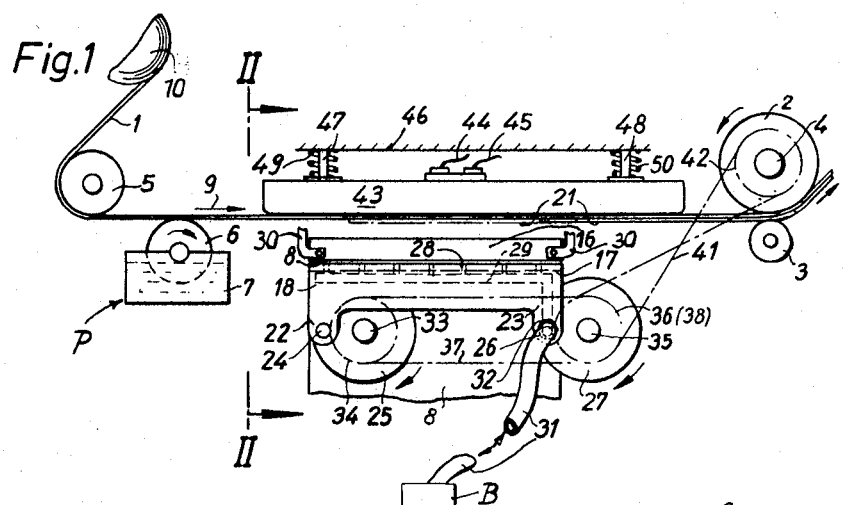

BY Michael S. Striker their ATTORNEY

United States Patent Office 3,431,827
Patented Mar. 11, 1969

3,431,827
APPARATUS FOR PRODUCING AND APPLYING TEAR STRIPS
Gunter Wahle, Reinbek, and Heinz-Christen Lorenzen, Hamburg, Germany, assignors to Hauni Werke, Korber & Co., K.G., Bergedorf, Germany
Filed July 14, 1967, Ser. No. 653,526
Claims priority, application Great Britain, July 26, 1966, 33,596/66
U.S. Cl. 93—1           14 Claims
Int. Cl. B31d 1/00; B23d 25/08

ABSTRACT OF THE DISCLOSURE

Tear strips are severed from the leading end of a continuously advancing tape by a stationary but adjustable cutter and a second cutter which performs a continuous translatory movement in an endless path and is provided with suction ducts to hold freshly formed strips during travel from the cutting station to a transfer station at which the strips are applied to a travelling web of wrapping material or to a suction belt which completes the delivery of strips to the web. A magazine collects tape upstream of the cutting station and discharges suitable lengths of tape into the range of the cutters while the second cutter travels from the transfer station back to the cutting station.

Background of the invention

This invention relates to improvements in apparatus for producing and applying tear strips to a continuous sheet or web or to a succession of precut blanks of wrapping or packing material, particulary for producing and applying tear strips to transparent or translucent webs which are used as outer wrappers on cigarette packs or the like.

Certain presently known types of tear strip producing and applying apparatus utilize intermittent feeds for wrapping material as well as for the tape which is subdivided into tear strips. A reciprocating cutter cooperates with a stationary cutter and simultaneously serves to apply freshly formed tear strips to the wrapping material. Such apparatus (see U.S. Patent No. 2,865,261) are unsatisfactory in connection with modern high-speed packing or wrapping machines for cigarettes because their operation is much too slow. In other words, the packing machine cannot be driven at a full speed because the reciprocating cutter cannot deliver tear strips at short intervals.

Certain other types of presently known apparatus utilize an indexible intermittently rotating tool which is provided with several radially extending cutters cooperating with a reciprocating cutter. The wrapping material is fed intermittently. The radial cutters can retain tear strips by suction. Such apparatus (see German Patent No. 1,128,355) are prone to malfunction and must be assembled of a very large number of costly precision-finished parts, particularly the indexible tool which must be provided with suction ducts for each radial cutter and with regulating means for controlling the suction in each angular position of the tool.

A third type of presently known apparatus utilizes pairs of substantially semicircular rotary cutters which deliver tear strips to similar transfer members arranged to hold tear strips by suction and to cooperate with heated wheels which weld the tear strips to a web of wrapping material. The operation is intermittent and, therefore, such apparatus, too, are much to slow for use in connection with high-speed packing or wrapping machines. Reference may be had to British Patent No. 1,057,023.

Summary of the invention

It is an important object of the present invention to provide a novel and improved high-speed apparatus which can form and apply tear strips at frequent intervals, with a high degree of accuracy and without curling, kinking or other damage to the strips.

Another object of the invention is to provide a relatively simple, compact, rugged and inexpensive tear strip forming and applying apparatus which can be used in connection with presently known packing or wrapping machines and which employs a simple cutting mechanism.

A further object of the invention is to provide an apparatus wherein the distance between the cutting and strip-applying stations is very short so that little time is wasted for transfer of tear strips from the tape which is being severed to yield tear strips to the point where the tear strips are placed into contact with the wrapping material.

An additional object of the invention is to provide a novel feed for the material which is being subdivided to yield tear strips.

A concomitant object of the instant invention is to provide a tear strip forming and applying apparatus which need not be provided with its own prime mover and wherein not only the material which yields tear strips but also the wrapping material may be fed continuously so that the mechanisms which effect such feed can consist of simple parts and undergo less wear than in apparatus wherein the wrapping material and/or the material which yields tear strips must travel intermittently.

Another object of the invention is to provide an apparatus which can apply a succession of tear strips with or without gaps between the ends of such strips, which can apply tear strips to individual blanks or to a continuous web of wrapping or packing material, and which can apply tear strips by welding, by resorting to adhesive or by welding and adhesive.

Briefly outlined, one feature of our invention resides in the provision of an apparatus for converting a sheet-like body or tape of tear strip material into a succession of tear strips and for applying successively formed tear strips to a succession of blanks or to a continuous web of wrapping material. The apparatus comprises a first feed for advancing a body of tear strip material in a first path; a first cutter having a cutting edge adjacent to one side and extending transversely of the first path, a second cutter adjacent to the other side of the first path opposite the first cutter and having a cutting edge extending transversely of the first path, drive means for imparting to the second cutter a continuous translatory movement in an endless second path in a first portion of which the two cutting edges cooperate to sever a tear strip from the leading edge of tear strip material and in a second portion of which the second cutter is relieved of the tear strip, and retaining means for holding successively formed tear strips on the second cutter between the first and second portions of the second path.

When the second cutter reaches the second portion of its endless path, it preferably travels at the exact speed of the wrapping material which is supplied continuously by a second feed. The second cutter can apply tear strips directly to the wrapping material or to a transfer member which preferably forms part of the feed for wrapping material and applies tear strips to the wrapping material. The arrangement is preferably such that the wrapping material and/or each successively formed tear strip is coated with a film of adhesive prior to actual contact between the wrapping material and tear strips.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

*Brief description of the drawing*

FIG. 1 is a side elevational view of an apparatus which embodies one form of my invention and wherein the mobile cutter delivers tear strips directly to a web of wrapping material;

FIG. 2 is a transverse vertical sectional view, substantially as seen in the direction of arrows from the line II—II of FIG. 1;

FIG. 4 is a side elevational view of a second apparatus which is substantially a mirror image of the apparatus shown in FIGS. 1 and 2.

*Description of the preferred embodiments*

Figure 3:
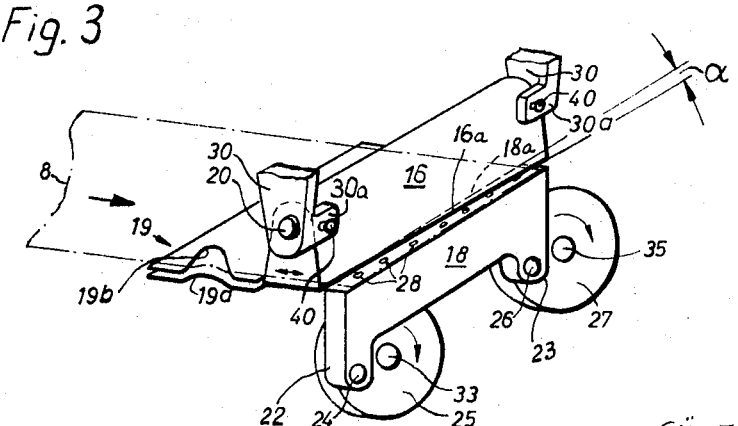
FIG. 3 is a greatly enlarged fragmentary perspective view of a portion of the structure of FIG. 1, showing certain details of the two cutters and of the feed for tear strip material.

Referring first to FIGS. 1 to 3, there is shown an apparatus which is utilized to convert a sheet-like body or tape 8 of tear strip material into tear strips 21 and to apply such tear strips to a travelling web 1 of wrapping material. The apparatus includes a feed for the web 1 which latter is being continuously withdrawn from a main source in the form of a bobbin 10. The feed includes a guide roll 5 and a pair of cooperating advancing rolls 2, 3 the former of which is driven by a horizontal shaft 4 receiving motion from the main drive of a packing or wrapping machine, not shown. During travel from the guide roll 5 to the nip between the advancing rolls 2, 3, the web 1 advances in a straight horizontal path. The roll 3 can be biased toward the roll 2 so as to insure that the latter draws the web 1 from the bobbin 10. The direction of travel of the web is indicated by the arrow 9. A paster P is installed adjacent to the path of the web 1 downstream of the guide roll 5 to apply to the underside of the web a narrow continuous film of adhesive material. This paster P comprises a paste tank 7 and a roller-shaped applicator 6 which dips into the supply of paste in the tank and transfers a film of paste onto the underside of the web 1. The parts 6, 7 could be installed upstream of the guide roll 5.

The tape 8 is stored on a second bobbin 15 and is supplied by a second feed which includes two pairs of advancing rolls 11, 12 and 13, 14. The second feed further includes a magazine 19 which is shown as being located immediately downstream of the advancing rolls 13, 14 and upstream of a first cutter 16. It will be seen that the path in which the tape 8 travels (arrow 9a) is normal to the path of the web 1. The cutter 16 is located at the upper side of the path in which the tape 8 is advanced past the magazine 19. At least one advancing roll of each pair is driven continuously; for example, the rolls 11 and 13 can receive motion from the drive shaft 4 for the advancing roll 2 or directly from the drive of the packing or wrapping machine.

The cutter 6 has a cutting edge 16a which extends transversely across the path of travel of the tape 8 and this cutter defines with a stationary guide 17 a narrow slit whose width exceeds only slightly the thickness of the tape. The slit is located immediately downstream of the magazine 19 and the guide 17 is adjacent to the underside of the tape. The magazine 19 has a curved bottom wall 19a whose upper side is convex and a curved top wall 19b whose underside is concave. The curvature of the top wall 19b exceeds considerably the curvature of the bottom wall 19a. The configuration of the walls 19a, 19b is best shown in FIG. 3.

The cutter 16 is mounted on a stationary support 46 including two downwardly extending brackets or arms 30 carrying coupling pins 20 which define a horizontal pivot axis for the cutter 16. This pivot axis extends transversely of the path of travel of the tape 8, i.e., in substantial parallelism with the cutting edge 16a. The cutter 16 is biased by one or more adjusting springs 39 which tend to rock it in a counterclockwise direction, as viewed in FIGS. 2 or 3. The brackets 30 are provided with lugs 30a which carry adjustable stop screws 40 serving to limit the extent of pivotal movement of the cutter 16 under the action of springs 39. The support 46 forms part of or consitutes the frame of the apparatus.

The apparatus further comprises a movable second knife or cutter 18 which is mounted at the underside of the tape 8 and is caused to perform a translatory movement in an endless path. A first portion of this endless path is adjacent to the cutting edge 16a of the cutter 16, and a second portion of the endless path is adjacent to the path in which the web 1 advances from the guide roll 5 toward the advancing rolls 2, 3. In this embodiment of the present invention, the cutter 18 performs several important functions, namely, its cutting edge 18a cooperates with the cutting edge 16a to sever the leading end of the tape 8 in order to form a tear strip 21, its retaining means (including one or more suction ducts 28) transfers tear strips 21 from the first to the second portion of the endless path, and it cooperates with a back support or anvil 43 to attach successive tear strips 21 to the film of adhesive which has been applied by the paster P. The cutter 18 has two downwardly extending projections 22, 23 which respectively carry pins 24, 26 forming part of the drive for the cutter 18 and each eccentrically secured to a disk-shaped wheel 25, 27. The arrangement is such that, when the cutter 18 reaches the first portion of its endless path, the cutting edge 18a crosses, in at least one plane, the cutting edge 16a of the upper cutter 16. The extent of mutual inclination of the cutting edges 16a, 18a is indicated in FIG. 3 by the angle alpha. The wheel 25 is fixed to a shaft 33 which is rigid with a gear 34. The shaft 35 of the wheel 27 is rigid with a second gear 36. A toothed belt 37 is trained around the gears 34, 36 and the shaft 35 further carries a gear 38 which is driven by a gear 42 through a crossed toothed belt 41. The gear 42 is mounted on the shaft 4 of the advancing roll 2. The transmission ratio of the just described gear train between the shaft 4 and the shafts 33, 35 is selected in such a way that, during travel in the second portion of its endless path, the cutter 18 travels at the same speed and in the same direction (arrow 9) as the web 1.

The suction ducts 28 in the movable cutter 18 form part of the aforementioned retaining means which serves to hold tear strips 21 on the cutter 18 while the latter travels from the first to the second portion of its endless path. The retaining means further comprises a channel 29 which is machined into the cutter 18 and communicates with each suction duct 28. A portion of the channel 29 is coaxial with the pin 26 and communicates with one end of a flexible conduit 31 which is coupled to the projection 23 of the cutter 18 by a nut 32. The other end of the conduit 31 is connected, alternatively, with the suction and pressure sides of a blower B so that the latter constitutes a suction generating device as well as a source of compressed air.

The aforementioned back support or anvil 43 is heated from within by one or more electric resistance heaters whose conductors are shown at 44 and 45. In the embodiment of FIGS. 1 to 3, the back support 43 is installed at a level above the cutter 16 and is reciprocable up and down under and against the bias of helical return springs 49, 50. The back support 43 is reciprocable along guide rods 47, 48 mounted on the support 46. When in the lower end position, the back support 43 is located directly above the path of the web 1 between the guide roll 5 and advancing rolls 2, 3.

The operation is as follows:

The shaft 4 drives the advancing roll 2 whereby the latter cooperates with the companion roll 3 to draw the web 1 from the bobbin 10. The web 1 travels around the guide roll 5 and its underside receives a narrow film of paste from the applicator 6. The upper side of the web travels along the underside of the back support 43. The width of the film of paste may but need not equal the width of tear strips 21; this film is always sufficiently narrow to prevent lateral escape of paste beyond the edges of successive tear strips.

The shaft 4 also drives the cutter 18 through the intermediary of the aforedescribed gear train including the gear 42 on the shaft 4, crossed belt 41, gear 38, shaft 35, gear 36, toothed belt 37, gear 34 and shaft 33. The shafts 33, 35 respectively drive the wheels 25, 27 and these wheels respectively drive the pins 24, 26 so that the cutter 18 performs a continuous translatory movement in an endless path. During each such travel in its endless path, the cutting edge 18a moves in a first portion of this path and then cooperates with the cutting edge 16a to sever the leading end of the tape 8 and to form a narrow tear strip 21 which immediately adheres to the cutter 18 because the suction ducts 28 are then connected with the suction side of the blower B through the intermediary of the channel 29 and conduit 31. FIGS. 2 and 3 illustrate the cutter 18 in a position in which its cutting edge 18a cooperates with the cutting edge 16a of the cutter 16.

The tape 8 is fed continuously into the magazine 19 by the aforementioned pairs of advancing rolls 11, 12 and 13, 14. In the course of the actual cutting or severing operation, the cutting edge 18a slides along the cutting edge 16a from the one toward the other end of the cutter 16 and causes the cutter 16 to change its angular position against the opposition of springs 39.

During travel in the first portion of its endless path, the cutter 18 is located substantially midway between its upper and lower dead center positions. This cutter then continues to move upwardly but without changing the position of inclination of its edge 18a and reaches the second portion of its path when it rises to the uppermost level determined by the eccentricity of pins 24, 26 with reference to the shafts 33, 35. The suction ducts 28 are in communication with the suction side of the blower B so that the tear strip 21 which has been removed from the leading end of the tape 8 travels with the cutter 18 and is applied over the film of adhesive at the underside of the web 1 when the cutter 18 reaches the back support 43. The suction ducts 28 are connected to the pressure side of the blower B when the cutter 18 reaches its upper dead center position so that the jets of air issuing from the ducts 28 press the tear strip 21 against the film of adhesive on the web 1. The back suport 43 may yield slightly against the opposition of return springs 49, 50 when the cutter 18 carries out the transfer of a freshly formed tear strip 21 onto the web 1 so that the bias of springs 49, 50 also contributes to strong application against and satisfactory adherence of tear strips to the web 1. The cutter 18 then begins to descend and travels through its lower dead center position and back into the first portion of its endless path to sever from the tape 8 a fresh tear strip 21. The previously formed tear strip 21 adheres to the underside of the web 1 and the adhesive paste is heated by the back support 43 so that it undergoes a desirable drying action and retains the tear strip with a requisite force.

While the cutter 18 travels from its upper toward its lower dead center position, it moves away from the right-hand end of the slit between the cutter 16 and guide 17 so that the leading end of the tape 8 is free to advance beyond the outlet of the magazine 19. The walls 19a, 19b cause the tape 8 to assume an undulate shape and such undulated portion of the tape 8 straigtens itself out immediately after the cutter 18 moves below the upper edge of the guide 17. The protruding portion of the tape 8 is then long enough to form a tear strip upon severing by the cutting edges 16a and 18a.

In the embodiment of FIGS. 1 to 3, the apparatus is arranged to apply a substantially uninterrupted line or file of tear strips 21. However, the strips 21 could be applied at longitudinally spaced intervals in response to appropriate changes in transmission ratio between the shaft 4 and the wheels 25, 27. Since the cutter 18 travels at the exact speed of the web 1 when it approaches the upper dead center position, and since this cutter then travels in the same direction as the web 1 (arrow 9), all of the tear strips 21 are applied to the adhesive film with utmost accuracy, i.e., without undesirable overlapping and/or without the formation of gaps between the ends of successive tear strips 21 at the underside of the web 1.

FIG. 4 illustrates a portion of a second apparatus which is substantially a mirror symmetrical replica of the apparatus shown in FIGS. 1 to 3. The back support 43 is located at a level below the cutter 16 and the cutter 18 applies tear strips 21 to the upper side of the web 1. The paster P is installed upstream of the guide roll 5 and furnishes a film of adhesive to that side of the web which is the upper side while the web travels in a straight horizontal path at a level above the back support 43. During movement from the first to the second portion of its endless path, the cutter 18 travels downwardly whereby its cutting edge transfers a freshly formed strip 21 against the adhesive film at the upper side of the web 1. The toothed belt 41 is not crossed (compare FIGS. 1 and 4).

The operation of the apparatus shown in FIG. 4 is clearly analogous to the operation of the previously described apparatus. The sole difference is that the cutter 18 reaches its lower dead center position (shown in FIG. 4) when it transfers a freshly formed tear strip 21 onto the upper side of the web 1. The manner in which the tape 8 is supplied into a magazine upstream of the cutter 16 and guide 17 is the same as shown in FIGS. 1 and 2. The guide 17 is located at a level above the cutter 16.

Figure 5:
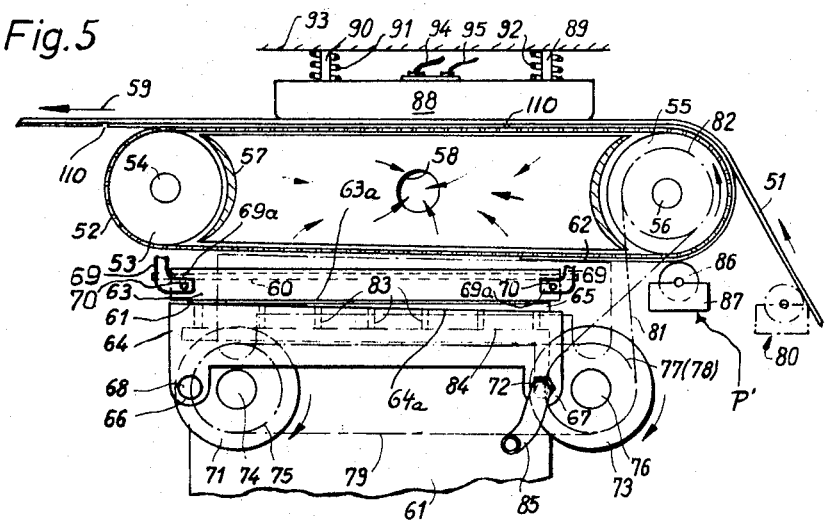
FIG. 5 is a side elevational view of a third apparatus wherein the mobile cutter delivers tear strips to a suction belt forming part of the feed for wrapping material.

Referring finally to FIG. 5, there is shown a third apparatus wherein the cutter which performs a translatory movement in an endless path is not used to effect direct transfer of freshly formed tear strips 62 onto a film of adhesive on the travelling web or body of wrapping or packing material. The web is shown at 51 and the tape is shown at 62. The feed for the web 51 includes a transfer member 52 which is constituted by a foraminous belt and which receives freshly formed tear strips 62 from the mobile cutter 64. The belt 52 is trained around an idler roller or drum 53 and a second roller or drum 55 which is driven by a shaft 56. The roller 53 is rotatable on or with a shaft 54. The shaft 56 receives torque from the main drive of a wrapping or packing machine, not shown. A stationary suction chamber 57 is installed between the upper and lower stringers of the belt 52 to draw air through the interstices or apertures of both stringers. The chamber 57 has an outlet 58 which is connected with the suction side of a suitable blower, not shown.

The feed for the tape 61 is not shown in FIG. 5 because it is preferably constructed and assembled in the same way as described in connection with FIGS. 1 and 2. Such feed may include one or more pairs of advancing rolls and a magazine which is located upstream of an adjustable cutter 63 corresponding to the cutter 16 of FIGS. 1 to 4. This cutter has a cutting edge 63a which cooperates with the cutting edge 64a of the cutter 64 to sever from the leading end of the tape 61 a succession of tear strips 62. An elongated guide 65 is located directly below the cutter 63 and defines therewith an elongated slit whose width does not substantially exceed the thickness of the tape 61. This slit is located downstream of the aforementioned magazine corresponding to the magazine 19 of FIGS. 1 to 3. The cutter 63 is pivotable about the axis of a coupling pin 60 which in journalled in brackets 69 forming part of or affixed to a stationary support 93. One or more springs serve to bias the cutter 63 against adjustable stop screws 70 mounted on lugs 69a of the brackets 69. Such spring or springs perform the same function as the springs 39 shown in FIG. 2.

The second cutter 64 is provided with two downwardly extending projections 66, 67 which respectively carry pins 68, 72 forming part of the drive which causes the cutter 64 to perform a translatory movement in an endless path. The pin 68 is eccentrically secured to a disk-shaped wheel 71 and the pin 72 is secured in similar fashion to a second disk-shaped wheel 73. The wheel 71 is rigid with a shaft 74 which carries a gear 75 driven by a toothed belt 79 which is trained around a gear 77 on the shaft 76 of the wheel 73. The shaft 76 carries a further gear 78 which is driven by a crossed toothed belt 81 trained around a gear 82 on the shaft 56 of the drum 55. Thus, the cutter 64 is also driven by the shaft 56 or, better to say, it also receives motion from the main drive of the packing or wrapping machine. The gears 77, 78 are of identical size and are provided with the same numbers of teeth.

The cutting edge 63a of the upper cutter 63 is horizontal but the cutting edge 64a of the mobile cutter 64 is inclined with respect to a horizontal plane, i.e., the cutting edges 63a, 64a cross each other. Furthermore, the cutting edges 63a, 64a also make with each other an angle alpha (see FIG. 3) so that these cutting edges cross each other in several planes. This insures that the cutters 63, 64 act not unlike the blades of scissors to form a clean cut across the leading end of the tape 61 when the cutter 64 travels through the first portion of its endless path substantially midway between its upper and lower dead center positions.

The lower stringer of the foraminous transfer belt 52 is located in a plane which is slightly inclined with reference to a horizontal plane. Its inclination with reference to the horizontal plane is similar to or identical with the inclination of the cutting edge 64a. The cutter 64 is formed with a row of suction ducts 83 which are adjacent to the cutting edge 64a and form part of retaining means which serves to insure that freshly formed tear strips 62 adhere to the cutter 64 during travel from the first portion of its endless path to a second portion of the same path (upper dead center position of the cutter 64). The suction ducts 83 communicate with a channel 84 which is machined into the cutter 64 and a portion of which extends into the pin 72. This pin is connected with a flexible conduit 85 which is connectable with the suction and pressure sides of a suitable blower in the same way as described in connection with FIGS. 1 to 3. Of course, the conduit 31 or 85 need not be connected with the pressure side of the blower or with another source of compressed air because it can also be connected with the atmosphere as soon as a tear strip comes in contact with the adhesive film at the adjoining side of the web 1 or with the lower stringer of the belt 52. The connection of suction ducts 83 with a source of compressed air is of lesser importance in the apparatus of FIG. 5 because the suction chamber 57 causes the tear strips 62 to adhere to the lower stringer of the belt 52 when such tear strips reach the second portion of the endless path for the cutter 64.

A paster P' is installed below the drum 55 to apply films of adhesive to the undersides of successive tear strips 62 which travel with the lower stringer of the belt 52. This paster P' comprises a tank 87 and a roller-shaped applicator 86. It is clear that the paster P' can be omitted if the apparatus is to apply a film of adhesive directly to the web 51, i.e., in the same way as described in connection with FIGS. 1 to 3. The paster P' is then replaced by a paster 80 (shown by phantom lines because it is normally used only if the paster P' is omitted) which coats the underside of the web 51 upstream of the belt 52.

An electrically heated back support or anvil 88 is installed at a level above the upper stringer of the endless transfer belt 52. This back support accommodates one or more electrical resistance heaters whose conductors are shown at 94 and 95. The back support 83 is reciprocable up and down along vertical guide rods 89, 90 and is biased downwardly by helical springs 91, 92. The rods 89, 90 are mounted on the support 93 which can form part of the frame.

The operation is as follows:

The shaft 56 of the drum 55 drives the belt 52 and the gear 82 so that the latter drives the toothed belt 81, gears 77, 78, toothed belt 79, shafts 74, 76 and pins 68, 72. Thus, the cutter 64 is compelled to travel in its endless path and to retain its position of inclination. The upper stringer of the belt 52 attracts the web 51 so that the web advances continuously in a direction to the left (arrow 59). Suction in the chamber 57 is sufficient to insure that the web 51 is advanced without slippage.

During each complete orbital movement, the cutter 64 causes its cutting edge 64a to cooperate with the cutting edge 63a and to separate a tear strip 62 from the leading end of the tape 61, i.e., from that portion of the tape 61 which has penetrated beyond the magazine located directly behind the slit between the cutter 63 and guide 65. The tape 61 is preferably fed continuously and by a feed which is similar or analogous to the feed shown in FIGS. 1 and 2. The suction ducts 83 are connected with the suction generating device when the cutting edges 64a, 63a form a tear strip 62 so that such strip adheres to the cutter 64 in the region of the cutting edge 64a and shares the movement of the cutter 64 to the upper dead center position in which the cutter 64 delivers the tear strip 62 to the lower stringer of the transfer belt 52. The upper dead center position of the cutter 64 (when this cutter reaches the second portion of its endless path) is indicated in FIG. 5 by phantom lines. The conduit 85 is disconnected from the suction generating device and is connected with the atmosphere or with a source of compressed gas as soon as the tear strip 62 which is carried by the cutter 64 moves sufficiently close to or actually reaches the lower stringer of the transfer belt 52. The suction chamber 57 then insures that the tear strip 62 adheres to the belt 52 immediately or closely behind the preceding tear strip so that such tear strips form a file which travels around the drum 55 whereby the exposed side of each strip is coated with adhesive supplied by the applicator wheel 86. The thus coated tear strips 62 are then caused to adhere to the underside of the web 51 in the region adjacent to the upper half of the drum 55. The web 51 travels below the heated back support 88 which expels surplus moisture from the adhesive film and insures satisfactory adherence of tear strips 62 to the web. The back support 88 can further enhance the strength of adhesive bonds between the web 51 and tear strips 62 by subjecting the web to mechanical pressure (bias of springs 91, 92) so that the tear strips 62 are compressed between the web and the upper stringer of the belt 52.

The apparatus of FIG. 5 is intended to apply the tear strips 62 in such a way that the leading end of each strip 62 is separated from the trailing end of the preceding tear strip by a relatively narrow clearance or gap 110. This apparatus is capable of insuring, with utmost reliability, that the web 51 travels at the exact speed of tear strips 62 when the tear strips come into contact with the web. This is due to the fact that the tear srips 62 are supplied to the web 51 by the transfer belt 52 which forms part of the feed for the web 51, i.e., the same member which drives the web also serves to apply tear strips to the travelling web. The apparatus of FIGS. 1 to 4 are more compact than the apparatus of FIG. 5 because the transfer belt 52 can be dispensed with in view of the fact that the second portion of the endless path for the cutter 18 is immediately adjacent to the path for the web 1. In each embodiment of our apparatus, the distance which a freshly formed tear strip must cover from the severing station to the point of application to the travelling web of wrapping or packing material is relatively short. The suction ducts 28, 83 and the suction chamber 57 insure that each tear strip (21 or 62) is transferred to the web while it is being held in extended position (without curling, kinking or like deformation). Furthermore, the ducts in the mobile cutter insure that the tear strips cannot slip with reference to the cutter during travel toward the path of the web or toward the transfer member. The output of the improved apparatus is very high because the web, the tape and the mobile cutter can advance continuously. Such continuous movement can be insured by resorting to relatively simple feeds and drive means. The apparatus of the present invention can be used with advantage in modern high-speed packing machines for cigarettss or like rod-shaped articles. In many presently known production lines for cigarettes or filter cigarettes, a single packing machine is capable of taking up the output of plural cigarette machines or filter cigarette machines. Therefore, such packing machines must receive tear strips at frequent intervals.

Certain important advantages of my improved apparatus can be summarized as follows:

The cutter 16 or 63 is adjustable and can yield during engagement with the mobile cutter 18 or 64 so that the cutting edges of these cutters can form a clean cut across the tape 8 or 61. Clean cutting action is further enhanced by such mounting of cutters that their cutting edges cross each other in one or more planes. The mobile cutter can be driven continuously and need not change its position of inclination so that the connection between this cutter and a source of compressed gas or a suction generating device includes a small number of simple, long-lasting and readily attachable or detachable parts. The transfer belt 52 of FIG. 5 can be used as a part of the feed for the wrapping material so that tear strips which approach the wrapping material must travel at the same speed. The magazine 19 insures satisfactory advance of tear strip material into the range of cutters 16, 18 or 63, 64. The mobile cutting member transports freshly formed tear strips at least part of the way between the cutting station and the path of wrapping material.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In an apparatus for converting a sheet-like body of tear strip material into a succession of tear strips and for applying successively formed tear strips to wrapping material, a combination comprising a feed for advancing a body of tear strip material in a first path; a first cutter having a first cutting edge adjacent to one side and extending transversely of said first path; a second cutter adjacent to the other side of said path opposite said first cutter and having a second cutting edge extending transversely of said path; drive means for imparting to said second cutter a continuous translatory movement in an endless second path in a first portion of which said cutting edges cooperate to sever a tear strip from the leading edge of said body and in a second portion of which said second cutter is relieved of the tear strip; and retaining means for holding successively formed tear strips on said second cutter between the first and second portions of said second path.

2. A combination as defined in claim 1, further comprising a second feed for advancing said wrapping material in a third path at the speed of said second cutter in said second portion of the second path.

3. A combination as defined in claim 1, further comprising a support for said first cutter and coupling means adjustably securing said first cutter to said support.

4. A combination as defined in claim 3, wherein said coupling means defines a pivot axis for said first cutter, said pivot axis extending transversely of said first path.

5. A combination as defined in claim 1, wherein said cutting edges cross each other.

6. A combination as defined in claim 1, wherein said retaining means comprises at least one suction duct provided in said second cutter adjacent to said second cutting edge and air evacuating means connected with said suction duct during travel of said second cutter from said first to said second portion of said second path.

7. A combination as defined in claim 6, further comprising means for admitting to said duct compressed air when said second cutter reaches the second portion of said second path.

8. A combination as defined in claim 1, wherein said feed comprises a magazine located upstream of said cutters to accummulate a supply of said tear strip material.

9. A combination as defined in claim 8, wherein said feed further comprises continuously operated advancing means for supplying tear strip material into said magazine so that said supply increases while said cutting edges sever a tear strip from such material.

10. A combination as defined in claim 1, further comprising a second feed for advancing said wrapping material in a third path at the speed of said second cutter in said second portion of said second path, said third path having a portion which is immediately adjacent to said second portion so that tear strips delivered by said second cutter are applied directly against successive zones of said wrapping material.

11. A combination as defined in claim 1, further comprising a second feed for advancing said wrapping material in a third path a portion of which is adjacent to but spaced from said second portion of said second path and wherein the wrapping material advances at the speed of said second cutter in the second portion of said endless path, and transfer means for transferring successive tear strips from the second portion of said second path to the wrapping material in said portion of the third path.

12. A combination as defined in claim 11, wherein said transfer means comprises an endless belt.

13. A combination as defined in claim 12, wherein said belt consists of foraminous material and further comprising a suction chamber adjacent to said belt to attract tear strips to the belt during travel from the second portion of said second path to said portion of the third path.

14. A combination as defined in claim 13, wherein said belt and said suction chamber form part of said second feed.

References Cited

UNITED STATES PATENTS

| | | | |
|---|---|---|---|
| 2,865,261 | 12/1958 | Seragnoli | 93—1 |
| 3,329,053 | 7/1967 | Kleinberg | 83—327 XR |

BERNARD STICKNEY, *Primary Examiner.*

U.S. Cl. X.R.

83—152, 327; 156—256